United States Patent [19]

Silver

[11] 4,157,842
[45] Jun. 12, 1979

[54] METHOD OF MAKING A PHOTOGRAPH ALBUM

[76] Inventor: Arthur W. Silver, 1200-37 Warburton Ave., Yonkers, N.Y. 10701

[21] Appl. No.: 828,819

[22] Filed: Aug. 29, 1977

[51] Int. Cl.² .............................................. B42D 1/00
[52] U.S. Cl. .................................... 281/38; 40/158 R
[58] Field of Search ............... 281/138, 24; 40/158 R, 40/158 B

[56] References Cited

U.S. PATENT DOCUMENTS

| 916,034 | 3/1909 | Scholes | 281/38 |
| 1,003,326 | 9/1911 | Broudy | 281/38 |
| 3,116,738 | 1/1964 | Wentges | 40/158 R |
| 3,124,300 | 3/1964 | Vonderscher | 281/38 |
| 3,785,013 | 1/1974 | Nugent | 281/24 UX |
| 3,856,332 | 12/1974 | Snedeker | 281/38 X |
| 4,048,740 | 9/1977 | Zitzelberger et al. | 40/158 R |

Primary Examiner—Frank T. Yost
Attorney, Agent, or Firm—Kenneth A. Koch

[57] ABSTRACT

A combination promotional booklet and photograph album is disclosed. The album includes a plurality of leafs, each leaf having a tab portion, a card portion, a weakened line of separation between the tab and card portions and a strip of adhesive disposed on the tab portion adjacent the line of separation.

1 Claim, 6 Drawing Figures

U.S. Patent
Jun. 12, 1979
4,157,842
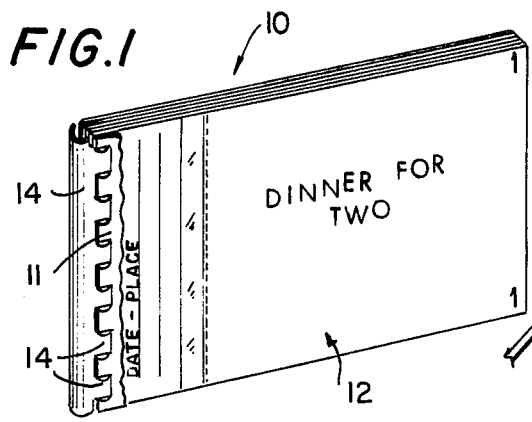
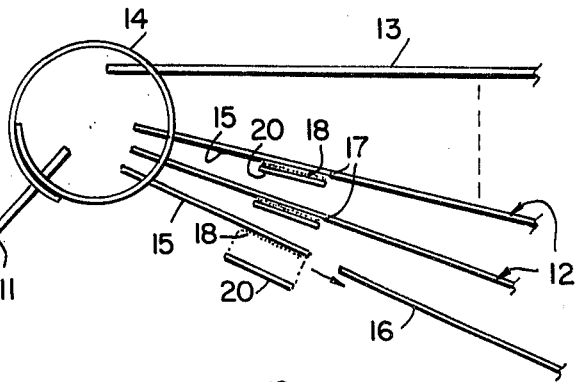
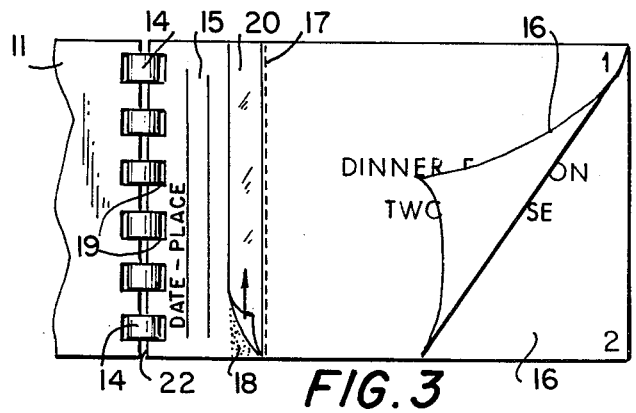
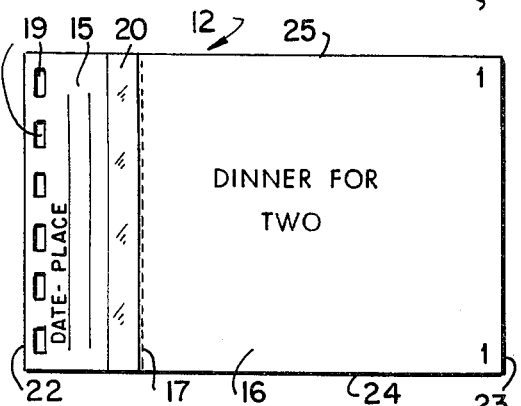
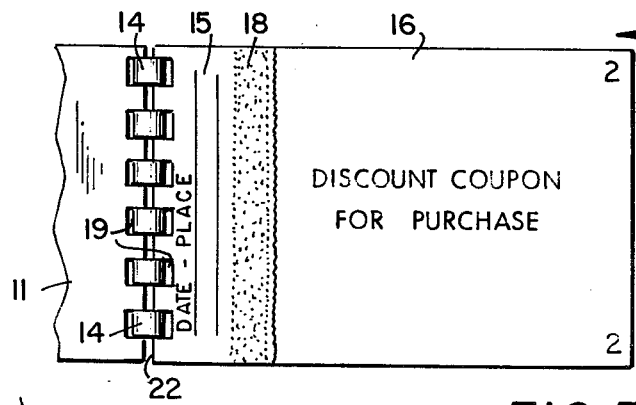
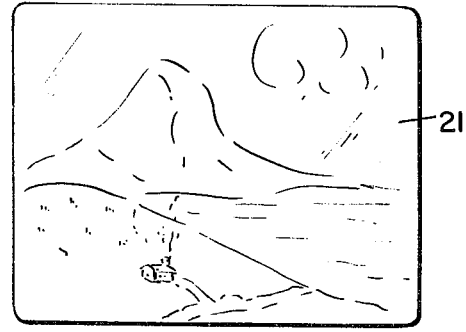
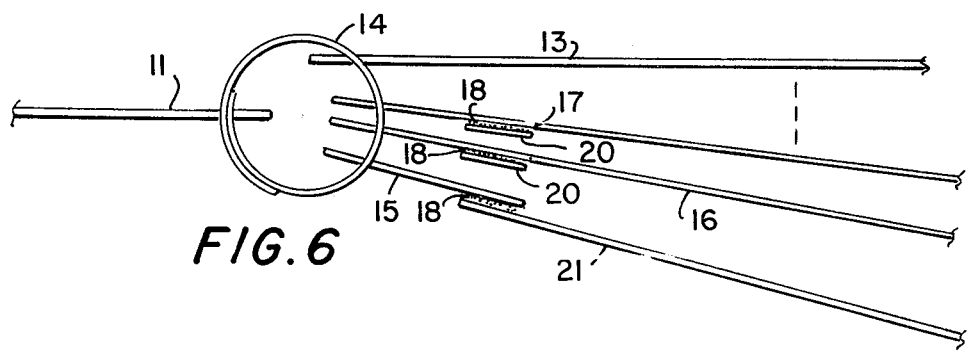

4,157,842

METHOD OF MAKING A PHOTOGRAPH ALBUM

FIELD OF INVENTION

The present invention pertains to leaf sheets for mounting photographs. More specifically, the invention provides leaf sheets that initially carry promotional material such as an advertising message, discount coupons or postcards and, after the promotional material is removed, are used for mounting photographs. The leaf sheets of the invention can be permanently bound in booklet form or can be removably joined to form an expandable album.

In recent years, various business enterprises such as airlines and travel agencies have undertaken promotional campaigns which have included discount coupons for various tourist attractions and retail shops. These coupons are used as an inducement to the tourist to visit a particular place or to patronize the promoted enterprise. Coupons of this nature are usually distributed as individual pieces of paper or as a plurality of tear-off coupons on a large sheet of paper.

It is an objective of the invention to provide a plurality of promotional coupons or like material bound together in booklet form of convenient pocket or purse size in such a manner that as the coupons are used, the booklet itself forms an album for photographs taken while travelling, without increasing the size of the booklet. In accordance with this objective, the booklet of promotional coupons itself is a promotional item in that it has the additional utility of a photograph album.

In accordance with a further aspect of the invention, a booklet of postcards instead of coupons, pertaining to particular tourist attractions can be provided. The postcards are replaceable by photographs taken by the tourist. In this regard, the invention provides a travel convenience, whereby the tourist would purchase a booklet of postcards either before he leaves home or upon his arrival and as he sends postcards home, he creates mounting space for photographs he is taking on his trip.

The new album provides a solution to the problem of how to protect photographs, particularly instant photos, taken during a trip and while travelling. The new album provides a convenient and permanent storage for photographs without requiring the traveler to carry an additional item. Although the photograph album of the invention is particularly useful with photographs taken with instantly developing cameras, the album is useable with any type or size of photograph.

PRIOR ART

The prior art includes patents disclosing the combination of a photograph or slide with a postcard. Patents of this type are Gyman et al U.S. Pat. No. 3,713,238 and MacHary U.S. Pat. No. 2,256,399. However, the articles disclosed in these patents are unitary, i.e., not separable into two sections.

The Wentges U.S. Pat. No. 3,116,738 shows a photo album wherein the photographs are attached to a tab by an adhesive. Wentges does not include a card section that is separable from the tab which is later used to hold the photograph.

Various techniques for adhesively mounting photographs on backing sheets are shown in U.S. Pat. Nos. 1,520,041; 3,442,041 and 3,987,569.

SUMMARY OF THE INVENTION

The invention provides an album leaf having a rectangular configuration and comprising a tab portion and a card portion; the tab portion being smaller in surface area than the card portion; the tab portion and card portions being separably connected by a weakened tear line; the tab portion having a strip of adhesive material adjacent the tear line; the tabs being adaptable to being joined together to form an album.

In accordance with a further aspect, the invention provides a uni-planar album leaf defined by a pair of generally parallel opposed short edges, a pair of generally parallel opposed long edges extending at generally right angles between the short edges, the album leaf comprising a tab portion, a card portion, a weakened line of separation extending transversely between the long edges and separating the tab and card portions and a strip of adhesive disposed on the tab portion and extending between said long edges generally parallel to the weakened line of separation.

BRIEF DESCRIPTION OF THE DRAWING

FIG. 1 is a perspective view of a booklet according to the invention with the top cover partially broken away.

FIG. 2 is an elevational view of the booklet of FIG. 1.

FIG. 3 is a plan view of the booklet of FIG. 1 in an open position.

FIG. 4 is a plan view of a leaf of the booklet of FIG. 1.

FIG. 5 is a plan view of the leaf of FIG. 4 in the booklet of FIG. 1, after removal of the card and before mounting of the photograph; and FIG. 6 is an elevational view similar to FIG. 2, after replacement of the card with a photograph.

DETAILED DESCRIPTION

Referring to FIGS. 1 and 2, a combination coupon booklet and photo album 10, according to the invention, is shown. The booklet includes a front cover 11 (broken away), a plurality of leafs 12, a back cover 13 and rings 14 for holding the booklet together.

Referring to FIGS. 3 and 4, each of the plurality of leafs 12 includes a tab portion 15, a card portion 16, a weakened line of separation 17 disposed between the tab portion 15 and card portion 16, an adhesive strip 18 disposed on the tab portion 15 adjacent the weakened line of separation 17 and means for joining a plurality of leafs together, shown in FIG. 4 as rectangular holes 19.

Typically, the tab portion 15 includes indicia in the form of named blank spaces for information pertaining to the photograph to be attached to the tab. The tab 15 is usually rectangular in shape and smaller in surface area than the card portion 16.

The adhesive strip 18 is preferably a layer of pressure sensitive adhesive imposed on the tab portion 15 adjacent to and parallel with the weakened line of separation 17. When a pressure sensitive adhesive is used, a release sheet 20 is provided to prevent the tabs from adhering to each other.

The card portion 16, is usually rectangular in shape and is separably connected to the tab portion 15 by the weakened line of separation 17. The card portion 16 can be printed on at least one side with various types of advertising intelligence, discount coupons or a postcard, ruled for note-taking or left blank.

Referring now to FIG. 5, the booklet 10 is shown with the coupon marked 1 ("Dinner for Two") in FIGS. 3 and 4 removed and the card portion 16 of the next leaf visible. The tab portion 15 of the first leaf remains and is ready to receive a photograph 21. The release sheet 20 is removed and pressure sensitive adhesive layer 18 is exposed. The edge portion of photograph 21 is positioned to overlie adhesive strip 18 as shown in FIG. 6 to affix the photograph in the album. According to this aspect of the invention, the photo 21 and the card portion 16 are substantially the same size although this size can vary to accommodate various formats. As additional coupons are used, they are replaced by photographs to eventually form a complete photo album.

Most preferably, the leafs 12 as shown in FIG. 4 lie in a single plane and are defined by a pair of generally parallel opposed short edges 22, 23 and a pair of generally parallel opposed long edges 24, 25 extending at generally right angles between the short edges 22, 23. The weakened line of separation 17, which extends transversely between long edges 24, 25, defines the end of the tab portion 15 and the beginning of the card portion 16. The weakened line of separation 17 is preferably a discontinuous series of perforations, but can be any suitable means for readily effecting separation of the card portion 16 from the tab portion 15.

Any suitable means for joining a plurality of leafs together to form an album or booklet may be used, including loose leaf rings and permanent bindings. Similarly, the front and back covers 11 and 13 of the album can be any suitable material; either rigid or flexible, transparent or opaque depending on the particular application.

The invention has been described with respect to various embodiments thereof and it should be appreciated that the invention is not limited to these, since equivalents may be substituted for the various elements. In determining the full scope of the invention, reference should be made to the following claims.

I claim:

1. A method of forming a photograph album from a booklet, said booklet comprising a front cover, a back cover, a plurality of leafs disposed between said front and back covers and means for joining said covers and leafs, each of said plurality of leafs having a rectangular configuration defined by a pair of generally parallel, opposed short edges, a pair of generally parallel long edges and comprising a single tab portion and a single card portion, said tab portion and card portion having a common dimension defined by said short edges, said tab portion being smaller in surface area than said card portion, said tab portion and card portion being separably connected by a weakened tear line, said weakened tear line being parallel to said short edges, said tab portion having a strip of adhesive material adjacent said tear line and extending between said long edges, said method including the steps of
    (a) removing said card portion from said tab portion along said weakened tear line and
    (b) attaching a photograph to said tab portion along said adhesive strip, said adhesive strip being the sole means joining said photograph to said tab portion,
    (c) said card portion and said photograph being of substantially the same size,
    (d) said photograph having indicia on at least one surface different from any indicia on said card portion.

* * * * *